Nov. 29, 1949  H. M. CLARK  2,489,699
AUXILIARY TRANSMISSION
Filed June 27, 1947  2 Sheets-Sheet 2
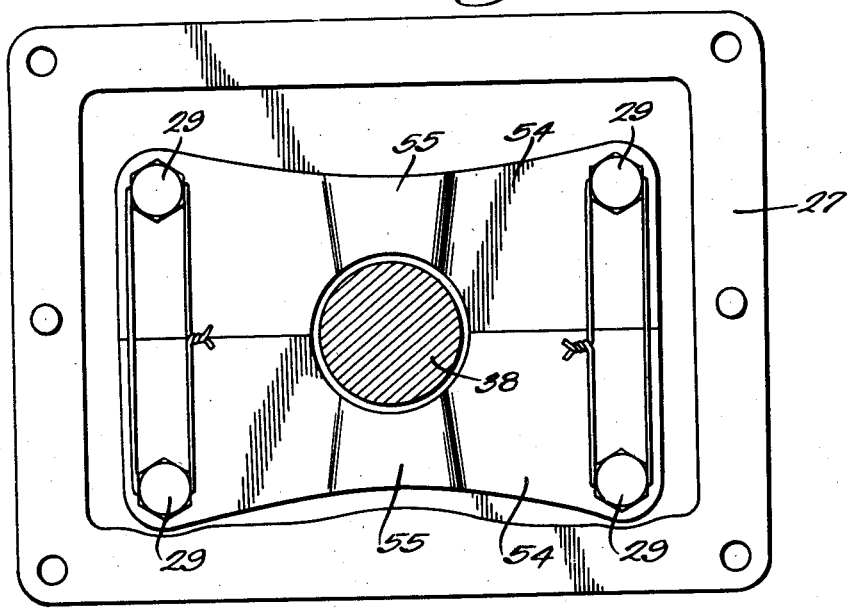
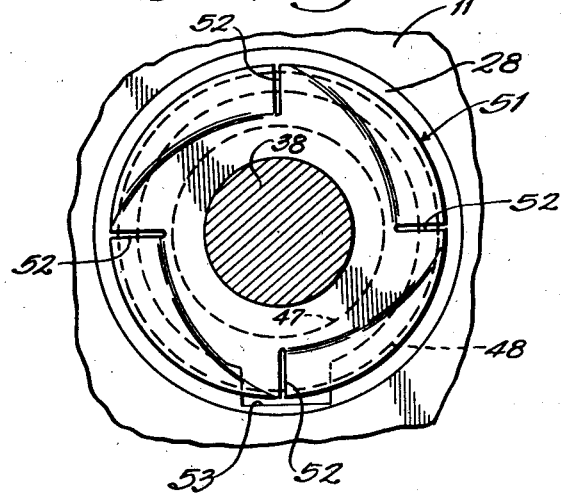 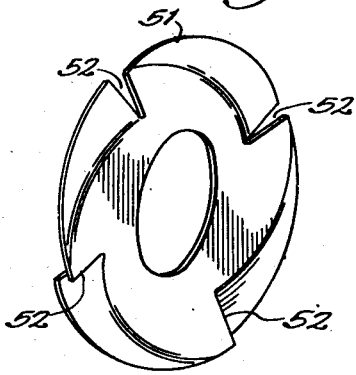
Inventor:
Hubert M. Clark,
Attorneys.

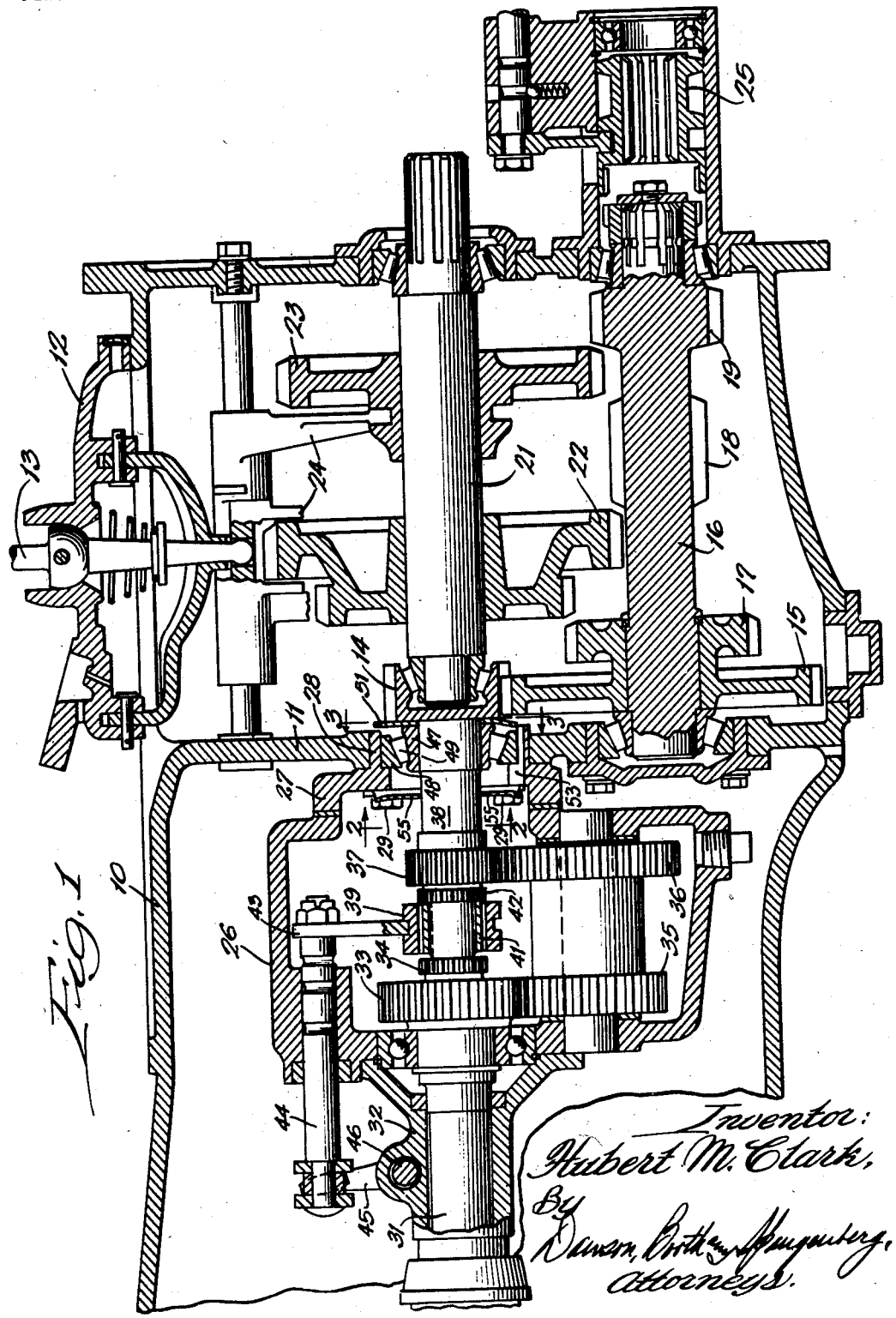

Patented Nov. 29, 1949

2,489,699

UNITED STATES PATENT OFFICE 2,489,699

AUXILIARY TRANSMISSION

Hubert M. Clark, Detroit, Mich., assignor to Sherman Products, Inc., Hazel Park, Mich., a corporation of Michigan Application June 27, 1947, Serial No. 757,480

7 Claims. (Cl. 184—11)

1

This invention relates to auxiliary transmissions and more particularly to transmissions adapted to be mounted in existing tractors or the like to supplement the speed ranges provided by the conventional tractor transmission.

In the copending application of Sherman and Clark, Serial No. 657,729, filed March 28, 1946, there is disclosed and claimed an auxiliary transmission adapted to be mounted on a tractor or the like to increase the number of speed and torque ratios available for operation of the tractor. The present invention relates to improvements in a transmission of this type to insure proper lubrication of the auxiliary transmission parts.

It is one of the objects of the present invention to provide an auxiliary transmission which will receive lubricant from the main transmission to which it is connected and in which provisions are made to maintain the auxiliary transmission properly filled with lubricant at all times.

Another object is to provide an auxiliary transmission in which a slinger disc is provided on the transmission output shaft tending to force lubricant into the transmission casing. In the preferred construction the lubricant enters the auxiliary transmission through a bearing on its output shaft and through a groove or passage around the bearings, the groove also serving as a drain when there is an excess of lubricant in the auxiliary transmission.

Still another object is to provide an auxiliary transmission in which a baffle is provided in the transmission casing to shield the output shaft bearing and to prevent the action of the gears from forcing lubricant from the casing through the bearing.

The above and other objects and advantages of the invention will be more readily apparent when read in connection with the accompanying drawings, in which—

Figure 1 is a longitudinal section illustrating an auxiliary transmission embodying the present invention mounted in a conventional tractor transmission;

Figure 2 is an enlarged partial section on the line 2—2 of Figure 1;

Figure 3 is a partial section on the line 3—3 of Figure 1; and

Figure 4 is a perspective view of the slinger disc.

The auxiliary transmission of the present invention is illustrated in Figure 1 mounted in a conventional tractor transmission including a housing indicated generally at 10. The housing

2 is divided by an integral center web 11 and carries at its top a cover plate 12 through which a shaft lever 13 extends. The transmission is adapted to be driven by a driving gear 14 which meshes with a gear 15 on a countershaft 16. The countershaft carries additional gears 17, 18 and 19 all of which are rigidly secured to or formed integral with the countershaft to turn therewith.

A driven shaft 21 extends through the transmission housing and has a pilot bearing in the driving gear 14, as shown. A compound gear cluster 22 and a pinion 23 are slidably splined to the driven shaft to be shifted thereon by yokes 24 operated by the shift lever 13. When the compound gear 22 is shifted to the left a small pinion part thereon will mesh with the gear 17, and when it is shifted to the right, a large gear portion thereon will mesh with the gear teeth 18. This provides two forward speeds at different ratios, and a third or intermediate forward speed may be provided by shifting the pinion 23 into engagement with the gear 19. For reverse the pinion 23 may be shifted to the left to engage an idler gear, not shown, meshing with the gear teeth 18. The countershaft may also drive a power take off including a splined sleeve 25 shiftable in an extension in the housing and carrying clutch teeth to engage complementary clutch teeth on the end of the countershaft.

The auxiliary transmission of the present invention forms a complete self-contained unit including a casing 26 adapted to enclose the transmission parts. The casing is closed at one end by a cover plate 27 which may be rigidly bolted to the casing and which terminates in an outwardly extending annular flange 28. The flange 28 is adapted to fit into an opening in the web 11 which normally carries a bearing for the conventional transmission clutch shaft and may be secured in place by screws or bolts 29.

The auxiliary transmission is adapted to be driven by an input or driving shaft 31 which may be connected to the tractor engine through the usual clutch and which is journaled in an elongated sleeve 32 integral with or rigidly secured to the casing 26. Internally of the casing the driving shaft carries a gear 33 formed with a reduced hub 34 having clutch teeth on its periphery. The gear 33 meshes with a gear 35 on a countershaft and which is rigidly connected to a larger gear 36. The gear 36 in turn meshes with a gear 37 which is rotatable on the driven shaft 38 of the auxiliary transmission. The shaft 38 in turn carries the driving gear 14.

The auxiliary transmission is adapted to provide two different speed and torque ratios through a shifting clutch collar 39 which is splined on a hub 41 which is rigid with the driven shaft 38. The clutch sleeve can be shifted to the left into mesh with the clutch teeth 34 to connect the driving shaft directly to the driven shaft or can be shifted to the right to mesh with clutch teeth 42 rigid with the gear 37 to connect the gear 37 to the driven shaft. This will provide an overdrive condition due to the relationship of the gears in the auxiliary transmission. Shifting may be accomplished by a yoke 43 engaging a groove in the clutch sleeve 39 and carried by a rod 44 which extends slidably through the casing 26. The rod may in turn be shifted by a lever 45 carried by a shaft 46 which is rotatably supported on the sleeve 32 and which may extend out through the transmission housing 10.

The driven shaft 38 is rotatably supported by an annular bearing which fits within the annular flange 28. As shown, the bearing is a tapered roller bearing having an inner race 47 which fits on the shaft 38 and an outer race 48 which may have a tight fit in the flange 28. The races are connected by conical rollers 49 which are arranged with their large ends toward the outside of the casing to absorb thrust on the gear 14. It is well known in the art that a bearing of this type tends to pump lubricant from its small end toward its large end so that the auxiliary transmission casing would tend to empty itself.

In order to insure an adequate supply of lubricant in the auxiliary transmission casing at all times, a slinger disc indicated generally at 51 is secured to the driven shaft 38 adjacent the outer edge of the flange 28 and preferably between the flange and the driving gear 14. As best seen in Figure 4, the slinger disc comprises a relatively thin annular disc formed of sheetmetal or the like which is slit at a number of points as indicated at 52 and is bent to form curved vanes. The vanes are at such an angle relative to the direction of rotation of the driven shaft 38 that they normally tend to force lubricant from the main transmission housing into the auxiliary transmission housing. The action of the slinger disc will, therefore, overcome the normal tendency of the lubricant to flow out through the bearing and will actually force lubricant inward through the bearing into the auxiliary transmission casing.

It has been found that in some cases sufficient lubricant cannot be forced through the bearing to maintain the auxiliary transmission filled to the proper level, and furthermore that the bearing does not provide adequate drainage in the event the auxiliary transmission becomes excessively full. Therefore, a supplemental passage around the bearing is provided by cutting a groove as shown at 53 into the flange around the bearing through which lubricant can flow. When the auxiliary transmission casing is not adequately filled, the slinger tends to force lubricant both through the bearing and through the groove 53 to bring the lubricant in the auxiliary casing up to the desired level quickly. In the event the level becomes excessive I have found that lubricant will flow from the auxiliary transmission casing through the groove 53 to maintain the level at the desired value even though the slinger continues to force lubricant into the casing through the bearing. In fact, it is advantageous to maintain a continuous circulation of lubricant through the auxiliary transmission during operation to improve the cooling characteristics of the auxiliary transmission.

In order to prevent the action of the gearing in the auxiliary transmission from interferring with proper lubricant flowing through the bearing, the bearing is preferably shielded by baffles. As shown in Figures 1 and 2, the baffles are formed by two plates 54 which are cut out at their centers to fit around the driven shaft 38 and which may be held in place by the fastening screws 29. The plates 54 are preferably offset at their centers as indicated at 55 to provide top and bottom passages to establish communication between the interior of the casing and the bearing and the groove 53. At the same time the baffles will prevent oil thrown up or splashed by the gears in the auxiliary transmission from being thrown out through the bearing or the passage. When the auxiliary transmission is filled, lubricant will flow into it through both the top and bottom passages formed by the offset portions 55. However, when the lubricant is at the desired level approaching the shaft 38 the head of lubricant on the bottom passage will cause lubricant to flow out of the casing through the groove 53 while lubricant continues to enter the casing through the bearing and the top passage. Thus a desirable continuous circulation of lubricant through the casing is provided.

While one embodiment of the invention has been shown and described in detail herein, it will be understood that this is illustrative only and is not to be taken as a definition of the scope of the invention, reference being had for this purpose to the appended claims.

What is claimed is:

1. An auxiliary transmission for use with tractors and the like comprising a casing, an annular flange projecting from one end of the casing for mounting it in a transmission housing, a driving shaft extending into the other end of the housing, a driven shaft extending through the flange, gear means in the casing connecting the driving and driven shafts, a transmission driving gear on the driven shaft outside of the casing, and a slinger disc on the driven shaft between the driving gear and the flange formed with angular vanes tending to force oil into the casing between the flange and the driven shaft.

2. An auxiliary transmission for use with tractors and the like comprising a casing, an annular flange projecting from one end of the casing for mounting it in a transmission housing, a driving shaft extending into the other end of the housing, a driven shaft extending through the flange, gear means in the casing connecting the driving and driven shafts, a transmission driving gear on the driven shaft outside of the casing, an annular bearing in the flange rotatably supporting the driven shaft, the flange being formed with a groove extending around the bearing, and a slinger disc on the driven shaft between the driving gear and the flange formed with vanes tending to force oil into the casing through the bearing and the groove.

3. An auxiliary transmission for use with tractors and the like comprising a casing, an annular flange projecting from one end of the casing for mounting it in a transmission housing, a driving shaft extending into the other end of the housing, a driven shaft extending through the flange, gear means in the casing connecting the driving and driven shafts, a transmission driving gear on the driven shaft outside of the casing, an annular bearing in the flange rotatably supporting the driven shaft, a baffle in the casing around the driven shaft, the baffle shielding the bearing to prevent the action of the gears in the casing from forcing lubricant from the casing therethrough, and a slinger disc on the driven shaft between the driving gear and the flange formed with vanes tending to force lubricant into the casing through the bearing.

4. An auxiliary transmission for use with tractors and the like comprising a casing, an annular flange projecting from one end of the casing for mounting it in a transmission housing, a driving shaft extending into the other end of the housing, a driven shaft extending through the flange, gear means in the casing connecting the driving and driven shafts, a transmission driving gear on the driven shaft outside of the casing, an annular bearing in the flange rotatably supporting the driven shaft, a baffle in the casing around the driven shaft, the baffle shielding the bearing to prevent the action of the gears in the casing from forcing lubricant from the casing therethrough, the flange being formed with a groove around the bearing, and a slinger disc on the driven shaft outside of the casing and adjacent the flange formed with vanes tending to force lubricant into the casing through the bearing and the groove.

5. An auxiliary transmission for use with tractors and the like comprising a casing, an annular flange projecting from one end of the casing for mounting it in a transmission housing, a driving shaft extending into the other end of the housing, a driven shaft extending through the flange, gear means in the casing connecting the driving and driven shafts, a transmission driving gear on the driven shaft outside of the casing, a tapered roller bearing in the flange with its large diameter end toward the outside of the casing and rotatably supporting the driven shaft, and a slinger disc on the driven shaft adjacent the outside of the flange formed with vanes tending to force lubricant into the casing through the bearing.

6. An auxiliary transmission for use with tractors and the like comprising a casing, an annular flange projecting from one end of the casing for mounting it in a transmission housing, a driving shaft extending into the other end of the housing, a driven shaft extending through the flange, gear means in the casing connecting the driving and driven shafts, a transmission driving gear on the driven shaft outside of the casing, a tapered roller bearing in the flange with its large diameter end toward the outside of the casing and rotatably supporting the driven shaft, a baffle in the casing around the driven shaft to the bearing to prevent the action of the gear means from forcing lubricant from the casing through the bearing, and a slinger disc on the driven shaft adjacent the outside of the flange formed with vanes tending to force lubricant through the bearing into the casing.

7. An auxiliary transmission for use with tractors and the like comprising a casing, an annular flange projecting from one end of the casing for mounting it in a transmission housing, a driving shaft extending into the other end of the housing, a driven shaft extending through the flange, gear means in the casing connecting the driving and driven shafts, a transmission driving gear on the driven shaft outside of the casing, a tapered roller bearing in the flange with its large diameter end toward the outside of the casing and rotatably supporting the driven shaft, a baffle in the casing around the driven shaft to shield the bearing to prevent the action of the gear means from forcing lubricant from the casing through the bearing, the baffle being formed to provide top and bottom openings into the casing, the flange being formed with a groove around the bearing opening into the space behind the baffle, and a slinger disc on the driven shaft adjacent the outside of the flange formed with vanes tending to force lubricant into the casing through the bearing and the groove.

HUBERT M. CLARK.

REFERENCES CITED

The following references are of record in the file of this patent:

UNITED STATES PATENTS

| Number | Name | Date |
| --- | --- | --- |
| 1,760,356 | Harper | May 27, 1930 |
| 1,782,184 | W. W. Wells | Nov. 18, 1930 |
| 1,938,201 | R. E. Wells | Dec. 5, 1933 |
| 1,952,954 | Thompson | Mar. 27, 1934 |
| 2,045,011 | Griswold | June 23, 1936 |
| 2,241,002 | Peterson | May 6, 1941 |